(12) United States Patent
Gusler et al.

(10) Patent No.: US 6,904,424 B1
(45) Date of Patent: Jun. 7, 2005

(54) METHOD AND A SYSTEM FOR MANAGING SHELL SCRIPT FILE DEVELOPMENT AND EXECUTION

(75) Inventors: Carl Phillip Gusler, Austin, TX (US); Rick Allen Hamilton, II, Austin, TX (US); Stephanie Elise Woods, Pearland, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/422,370

(22) Filed: Oct. 21, 1999

(51) Int. Cl.[7] ............................................. G06F 17/30
(52) U.S. Cl. ................................. 707/1; 707/3; 707/10; 707/104.1; 707/203; 717/116; 717/167; 717/168; 717/139; 717/138
(58) Field of Search ................................. 707/1–10, 201

(56) References Cited

U.S. PATENT DOCUMENTS

| | | | |
|---|---|---|---|
| 5,390,314 A | * 2/1995 | Swanson ..................... 717/138 |
| 5,404,528 A | 4/1995 | Mahajan ..................... 395/650 |
| 5,657,438 A | 8/1997 | Wygodny et al. ........... 395/180 |
| 5,675,780 A | * 10/1997 | Plant-Mason et al. ......... 707/6 |
| 5,732,219 A | * 3/1998 | Blumer et al. .............. 709/227 |
| 5,754,760 A | 5/1998 | Warfield ................ 395/183.14 |
| 5,761,684 A | 6/1998 | Gibson ....................... 707/515 |
| 5,850,511 A | * 12/1998 | Stoecker et al. .............. 714/38 |
| 5,983,001 A | * 11/1999 | Boughner et al. ............ 714/38 |
| 5,983,019 A | * 11/1999 | Davidson .................... 717/139 |
| 6,061,698 A | * 5/2000 | Chadha et al. .............. 707/513 |
| 6,161,218 A | * 12/2000 | Taylor ........................ 717/11 |
| 6,167,534 A | * 12/2000 | Straathof et al. ............. 714/38 |

* cited by examiner

*Primary Examiner*—Jean M. Corrielus
*Assistant Examiner*—Anh Ly
(74) *Attorney, Agent, or Firm*—Duke W. Yee; David A. Mims, Jr.; Lisa B. Yociss

(57) ABSTRACT

Initially, "libraying" text is inserted on all scripts executed on the computer, allowing administrators to discern at a glance every script that has been executed. Furthermore, administrators can easily ascertain the results of all automatically run programs (such as overnight batch jobs) by looking in a common location rather than all over the computer. All scripts installed on a computer system are required to have the ability to generate uniform output. This output includes the script name, the time it was run, the user name and the script execution results. When a script is executed, it will write this detailed output into a predefined directory. There, a file is generated which lists all the parameters associated with the script execution. The parameters are then available for future review by administrators. Additionally, an executed script writes a summary output to a common file. This file provides a single point of reference and further provides a summary description for all activities.

25 Claims, 19 Drawing Sheets

```
#!/bin/ksh
####################################################################

# summary_log_starter.ksh
#                Version 0.01
#              Runs various AIX commands to start summary log
#                                        for custom scripts

#              Assembled by Carl Gusler
IBM Global Services
IBM Austin
cgusler@us.ibm.com

(With help from many friends)

Copyright IBM 1996, 1997, 1998
Controlled Distribution
Protected under the procedures, processes, rights
rules, regulations, and retributions of
IBM Global Services
Intellectual Capital Management

####################################################################
#----------------------------------------------------------------

#  Copyright Information: Copyright IBM 1998
#       Controlled Distribution
Protected under the procedures, processes, rights
rules, and regulations of
IBM Global Services
Intellectual Property Management

This program is an IBM Type II Deliverable as
described in the IBM Customer Agreement and
relevant IBM services contracts.

IBM retains all rights to this program and does not
transfer any rights for replication or distribution
of this program except for the following:
1. Backup/archive copies taken as a normal
course of system maintenance.
2. Copying the program to a similar machine
within the same enterprise.

The customer agrees to restrict access to this
program as they would their own proprietary code,
and to notify IBM should unauthorized distribution
occur.

#  This program is distributed on an "as is" basis,
no warranty is expressed or implied.

```

FIG. 7A

```
#----------------------------------------------------
#----------------------------------------------------

# Description: Place starting header on system-wide script summary log
# Operational Environment:   AIX V4
# Input:
# Output:
# Return Value:
# Comments:

#----------------------------------------------------

#----------------------------------------------------

# Version History:   None

#----------------------------------------------------

#----------------------------------------------------

# Environmental Variables

#----------------------------------------------------
# Constants

# Variables
numeric_date=$(date +%m%d%y)
text_date=$(date +%d%b%Y)
typeset -i return_code
typeset -i retain_days=90
typeset -i in_retain_days
invoked_name=$0
script_name=${invoked_name##*/}
hostname=$ (hostname -s)

# Process Control Variables
r_flag=0

# Files
log_dir=/var/adm/scriptlogs
summary_log=/var/adm/scriptlogs/summary.$hostname.$text_date
log_names=summary.$hostname

#----------------------------------------------------

# Function:  show_usage
#    Description: Displays command usage syntax and exits
#    Input:   None
#    Output:  Usage message to standard error
#    Return Value: 2
```

FIG. 7B

```
#       Note: This function does not return.   It completely exits.

#-----------------------------------------------------------------
show_usage ()
{
    print -u2 "                    "
    print -u2 "Usage: summary_log_starter.ksh [-r days]"
    print -u2 "                    "
    print -u2 "           -r days    Log retention period."
    print -u2 "                      Default is" $retain_days
    print -u2 "                    "
    exit 2
}
#-----------------------------------------------------------------

#   Korn Shell Settings

#-----------------------------------------------------------------
#set -o errexit      # Turn on error trapping and error exit mode
#set -o noclobber    # Prevent overwriting of existing files
#set -o noexec       # Perform syntax checking without execution
#set -o nolog        # Prevents storing function defs in history file
#set -o xtrace       # Turn on debug mode

#-----------------------------------------------------------------

#   Main Routine

#                                      BRUTE FORCE APPLIED HERE!

#                                      Suggestions for refinement and elegance
#                                      are always welcome.
#   110110111

#-----------------------------------------------------------------

# Parse Command Line Arguments into Variables
while getopts f:l:emM:Ljr# c
do
     case $c in
     r)       # Set up the -r flag
              r_flag=1
              in_retain_days=$OPTARG;;
     :)       show_usage;;
     \?)      show_usage;;
     esac
done
shift $((OPTIND-1))

Deal with invocation errors if [[ $r_flag -eq 1 ]]; then
     retain_days=$in_retain_days
```

FIG. 7C

```
fi mkdir -p $log_dir 2>/dev/null
Clear old log files
find $log_dir -name "$log_names.*" -mtime $retain_days -exec rm {} \;

# Perform Work
Create new log files exec 3>> $summary_log      # Open log file for writing print -u3   "\n=================================================="
print -u3   "=================================================="
print -u3   "=                                                =="
print -u3   "=   Systems Management Script Summary Log        =="
print -u3   "=                                                =="
print -u3   "=   This file contains one days worth of start and stop   =="
print -u3   "=         transaction reports for customized             =="
print -u3   "=         system management scripts.                     =="
print -u3   "=                                                =="
print -u3   "=   Todays transactions are for systems management scripts ==" 
print -u3   "=          on system: " $(hostname)
print -u3   "=          beginning: " $(date)
print -u3   "=                                                =="
print -u3   "=                                                =="
print -u3   "=   Log scripts from specific systems management scripts  =="
print -u3   "=          in directory: " $log_dir
print -u3   "=                                                =="
print -u3   "=================================================="
print -u3   "=================================================="

exec 3<&-
```

FIG. 7D

```
#! /bin/ksh
##################################################################

# template1.ksh
#                       Version 1.00
#               Runs various AIX commands to

#               Assembled by Carl Gusler
IBM Global Services
IBM Austin
cgusler@us.ibm.com

(With help from many friends)

Copyright IBM 1996, 1997, 1998
Controlled Distribution
Protected under the procedures, processes, rights
rules, regulations, and retributions of
IBM Global Services
Intellectual Capital Management

##################################################################

#--------------------------------------------------------------

#   Copyright Information:   Copyright IBM 1998
#           Controlled Distribution
Protected under the procedures, processes, rights
rules, and regulations of
IBM Global Services
Intellectual Property Management

This program is an IBM Type II Deliverable as
described in the IBM Customer Agreement and
relevant IBM services contracts.

IBM retains all rights to this program and does not
transfer any rights for replication or distribution
of this program except for the following:
1. Backup/archive copies taken as a normal
course of system maintenance.
2. Copying the program to a similar machine
within the same enterprise.

The customer agrees to restrict access to this
program as they would their own proprietary code,
and to notify IBM should unauthorized distribution
occur.

```

*FIG. 8A*

```
#           This program is distributed on an "as is" basis,
no warranty is expressed or implied.

#-----------------------------------------------------------------

#-----------------------------------------------------------------

# Description: Perform and log mksysb activities
# Operational Environment:  AIX V4
# Input:
# Output:
# Return Value:
# Comments:

#-----------------------------------------------------------------

#-----------------------------------------------------------------

# Version History: None

#-----------------------------------------------------------------

#-----------------------------------------------------------------

# Environmental Variables

#-----------------------------------------------------------------
# Constants

# Variables
target=/dev/rmt0
numeric_date=$(date +%m%d%y)
text_date=$(date +%d%b%Y)
typeset -i return_code
typeset -i completion_code
typeset -i retain_days=90
typeset -i in_retain_days
invoked_name=$0
script_name=${invoked_name##*/}
hostname=$(hostname -s)

# Process Control Variables
i_flag=0
e_flag=0
l_flag=0
L_flag=0
n_flag=0
m_flag=0
M_flag=0
```

*FIG. 8B*

```
f_flag=0
r_flag=0
j_flag=0
use_tape=0
```

*FIG. 8C*

Files

```
default_log_dir=/var/adm/scriptlogs
default_log_file=$script_name.$text_date
summary_log=/var/adm/scriptlogs/summary.$hostname.$text_date
summary_file=/tmp/summary.$script_name.$text_date.$$
summary_work_file=/tmp/sum_work.$script_name.$text_date.$$
stdout_file=/tmp/stdout.$script_name.$text_date.$$
stderr_file=/tmp/stderr.$script_name.$text_date.$$
```

MKSYB EXCLUSION FILE IS /etc/exclude.rootvg

```
#-------------------------------------------------------

# Function: show_usage
#    Description: Displays command usage syntax and exits
#    Input: None
#    Output: Usage message to standard error
#    Return Value: 2
#    Note: This function does not return. It completely exits.

#-------------------------------------------------------
show_usage ()
{
   print -u2 "                        "
   print -u2 "Usage: template1.ksh [-f file] [-l directory] [-e ] [ -m ] [-r days] [ -L ] [ -j ]"
   print -u2 "           -f file       Target mksysb image file or device."
   print -u2 "                         Default is" $target
   print -u2 "           "
   print -u2 "           -m            Create physical partition maps."
   print -u2 "           "
   print -u2 "           -e            Use mksysb file filtering."
   print -u2 "           "
   print -u2 "           -j            Eject tape if target device is tape drive."
   print -u2 "           "
   print -u2 "           -l directory  Log output directory."
   print -u2 "                         Default is" $default_log_dir
   print -u2 "           "
   print -u2 "           -r days       Log retention period."
   print -u2 "                         Default is" $retain_days
   print -u2 "           "
   print -u2 "           -L            Prevent results logging."
```

```
            print -u2 "                  "
            print -u2 "    -M address        Enable e-mail notification of
completion status."
            print -u2 "                      Recipient is address (local or remote)"
            print -u2 "                  "
            exit 2
}
#----------------------------------------------------------------

#   Korn Shell Settings

#----------------------------------------------------------------
#set -o errexit       # Turn on error trapping and error exit mode
#set -o noclobber     # Prevent overwriting of existing files
#set -o noexec        # Perform syntax checking without execution
#set -o nolog         # Prevents storing function defs in history file
#set -o xtrace        # Turn on debug mode

#----------------------------------------------------------------

#   Main Routine

#                          _____/ |      BRUTE FORCE APPLIED HERE!
#                         ||||||  |
#                   /|__ _|_____|_     Suggestions for refinement and elegance
#                  / |=(0    0    0)     are always welcome.
#        110110111/__|  -------------
#----------------------------------------------------------------

log_dir=$default_log_dir
# Parse Command Line Arguments into Variables
while getopts f:l:emM:Ljr# c
do
    case $c in
    f)      # Set up the -f flag
            f_flag=1
            in_file=$OPTARG;;
    L)      # Set up the -L flag
            L_flag=1;;
    l)      # Set up the -l flag
            l_flag=1
            log_dir=$OPTARG;;
    m)      # Set up the -m flag
            m_flag=1;;
    e)      # Set up the -e flag
            e_flag=1;;
    r)      # Set up the -r flag
            r_flag=1
```

FIG. 8D

```
                in_retain_days=$OPTARG;;
        j)      # Set up the -j flag
                j_flag=1;;
        M)      # Set up the -M flag
                L_flag=0
                M_flag=1
                in_email_address=$OPTARG;;
        :)      show_usage;;
        \?)     show_usage;;
        esac
done
shift $((OPTIND-1))

Deal with invocation errors

# Configure Logging

#   Standard operation offers three types of logging:
#       1:  A running log of detailed progress is kept open during
#           script execution.  File is closed at completion of script.
#       2:  A start report and a separate stop report are posted to
#           a single system-wide log of script activity.
#       3:  A combined start and stop report is e-mailed to a selected user
#           on completion of the script.

#   The standard model of capturing information from commands for
#       inclusion in the log files is as follows:

#       command 1>/tmp/stdout 2>/tmp/stderr
#       cat /tmp/stdout >> $log_file
#       cat /tmp/stderr >> $log_file

#   This command triplet would be used for all important, invasive
#       commands, where it is important to capture output to the logs.

#   There are default names for all the log files, but not the e-mail ID.
#   The user can override the log names at invocation time.
#   The user can prevent logging (logs to bit bucket.)

if [[ $L_flag -eq 1 ]]; then
    log_file=/dev/null                          # Log to bit bucket
elif [[ $l_flag -eq 1 ]]; then
    log_file=$in_log_dir/$default_log_file
    mkdir -p $in_log_dir 2>dev/null             #Create new log directory
    mkdir -p $default_log_dir 2>/dev/null       # Create default log directory
else
    log_file=$default_log_dir/$default_log_file
    mkdir -p $default_log_dir 2>/dev/null       # Create default log directory
fi
```

*FIG. 8E*

```
if [[ $r_flag -eq 1 ]]; then
    retain_days=$in_retain_days
fi

# Clear old log files
find $log_dir -name "$script_name*" -mtime $retain_days -exec rm {} \;

Create new log files exec 3>> $log_file  # Open log file for writing if [[ $L_flag -eq 0 ]]; then
    exec 4> $summary_work_file        # Open summary work file for writing
    print -u4 "\n================================================="
    print -u4 "=                                                ="
    print -u4 "=    System Admin Script File Starting           ="
    print -u4 "=                                                ="
    print -u4 "=    Generated by script:    " $script_name
    print -u4 "=                on system: " $(hostname)
    print -u4 "=                at:        " $(date)
    print -u4 "=                                                ="
    print -u4 "=================================================="
    exec 4<&-
    cat $summary_work_file >>$summary_log
    cat $summary_work_file >$summary_file
fi print -u3 "\n================================================="
print -u3 "=                                                ="
print -u3 "=    Systems Management Transaction Log          ="
print -u3 "=                                                ="
print -u3 "=    Created by script: " $script_name
print -u3 "=             on system: " $(hostname)
print -u3 "=             at:        " $(date)
print -u3 "=                                                ="
print -u3 "=================================================="

Perform Work

# Locate target file or device for mksysb image
if [[ $f_flag -eq 1 ]]; then
    if [[ $in_file = /dev/rmt[0-9]* ]]; then     # Test if target is tape drive
        use_tape=1
        if [[ -c $in_file ]]; then               # Test if tape drive exists
            target=$in_file
        else
            print -u2 "\nNonexistent tape drive" $in_file
            show_usage
        fi
    else
```

*FIG. 8F*

```
                    target=$in_file
            fi
        fi

#   Run appropriate mksysb command and capture return code
    if [[ ($e_flag -eq 1) && ($m_flag -eq 1) ]]; then
    #           mksysb -i -e -X -m $target >/dev/null 2>>$log_file
        print -u1 "mksysb -i -e -X -m $target >/dev/null 2>>$log_file"
                return_code=$?
    elif [[ $m_flag -eq 1 ]]; then
    #           mksysb -i -m -X $target >/dev/null 2>>$log_file
        print -u1 "mksysb -i -m -X $target >/dev/null 2>>$log_file"
                return_code=$?
    elif [[ $e_flag -eq 1 ]]; then
    #           mksysb -i -e -X $target >/dev/null 2>>$log_file
        print -u1 "mksysb -i -e -X $target >/dev/null 2>>$log_file"
                return_code=$?
    else
    #           mksysb -i -X $target_file >/dev/null 2>>$log_file
        print -u1 "mksysb -i -X $target_file >/dev/null 2>>$log_file"
                return_code=$?
    fi if [[ ($j_flag -eq 1) && ($use_tape -eq 1) ]]; then
        print -u1 "tctl -f" $target "rewind and offline"
    #       tctl -f $target rewind
    #       tctl -f $target offline          # Eject tape if j flag set
    fi print -u3 \n=================================================
    print -u3 "=                                               ="
    print -u3 "=    Systems Management Transaction Log         ="
    print -u3 "=                                               ="
    if [[ $completion_code -eq 0 ]]; then
        print -u3 "=    Completed successfully at       :" $ (date)
    else
        print -u3 "=    Complete UNSUCCESSFULLY at      :" $ (date)
    fi
    print -u3 "=                                               ="
    print -u3 "================================================="

exec 3<&- if [[ $L_flag -eq 0 ]]; then
        exec 4> $summary_work_file          #Open summary work file for writing
        print -u4 \n=================================================
        print -u4 "=                                               ="
        print -u4 "=    System Admin Script File Stopping          ="
        print -u4 "=                                               ="
        print -u4 "=    Generated by script: " $script_name
```

*FIG. 8G*

```
print -u4 "=      on system:  " $(hostname)
print -u4 "=      at:         " $(date)
print -u4 "=                                                                   ="
if [[ $completion_code -eq 0 ]]; then
    print -u4 "=    Completed successfully."
else
    print -u4 "=    Completed UNSUCCESSFULLY."
fi
print -u4 "=                                                                   ="
print -u4 "===================================================================="
exec 4<&-
cat $summary_work_file >>$summary_log
cat $summary_work_file >>$summary_file
fi if [[ $M_flag -eq 1 ]]; then
    mail -s "Script Log Status" $in_email_address <$summary_file
fi

#####################################################################

# Korn Shell Reference/Refresher/Reminder
#    (Delete this appendage from production script.)

#    Remember, the Korn Shell shipped with AIX V3.1 through AIX V4.3.1
#       is the original Korn Shell, not the newer 1994 version.
#       The CDE Desktop Korn Shell is the newer 1994 version.

#    /bin/ksh            - 1988 Korn Shell
#    /usr/dt/bin/dtksh   - 1994 Korn Shell

#####################################################################
#--------------------------------------------------------------------

# Key Parameters
#    $0      Name of the shell, script, or function
#    $1,..   Positional parameters
#    $@      All positional parameters as separate strings
#    $*      All positional parameters as single string
#    $#      Number of positional parameters
#    $-      Option flags
#    $?      Return value of last command, function, or program
#    $$      Process ID of this shell
#      $!    Process ID of last background command or process

#--------------------------------------------------------------------

# Setting Variable Attributes
#    typeset -u var=ABC    Uppercase
```

FIG. 8H

```
#    typeset  -l        Lowercase
#    typeset  -i        Integer
#    typeset  -i8       Octal Integer
#    typeset  -n x=y    Name reference (x for y)          FIG. 8I
#    typeset  -A        Associative Array
#    typeset  -Ai       Integer Associative Array
#    typeset  -E4       Exponential with 4 Significant Figures
#    typeset  -F2       Floating Point with 2 Decimal Places
#    typeset  -L2       Left Justified with 2 Places
#    typeset  -LZ2      Left Justified, Leading Zeros Stripped
#    typeset  -R2       Right Justified with 2 Places
#    typeset  -RZ2      Right Justified, Leading Zeros Stripped
#    typeset  -r        Read-Only
#    typeset  -x        Export
#    typeset  -t        User-defined Tag

#    typeset  -p        Display all variables, attributes, values

#------------------------------------------------------------------

#  Condition Testing
#     [[  -e file  ]]     file exists
#     [[  -r file  ]]     file exists and read permission set
#     [[  -w file  ]]     file exists and write permission set
#     [[  -x file  ]]     file exists and execute permission set
#     [[  -r file  ]]     file exists and is regular file
#     [[  -d file  ]]     file exists and is directory
#     [[  -c file  ]]     file exists and is character special file
#     [[  -b file  ]]     file exists and is a block special file
#     [[  -p file  ]]     file exists and is a named pipe file
#     [[  -S file  ]]     file exists and is a socket file
#     [[  -u file  ]]     file exists and SUID permission is set
#     [[  -g file  ]]     file exists and GUID permission is set
#     [[  -k file  ]]     file exists and sticky bit is set
#     [[  -s file  ]]     file exists and has size greater than zero
#     [[  -L file  ]]     file exists and is a symbolic link
#     [[  -h file  ]]     file exists and is a symbolic link (hard link?)
#     [[  -O file  ]]     file exists and owner is effective user id
#     [[  -G file  ]]     file exists and group is effective group id

#     [[  -o option ]]    option is on
#     [[  -z string ]]    string has zero length
#     [[  -n string ]]    string has non-zero length

#     [[  string == pattern ]]   string matches pattern
#     [[  string != pattern ]]   string does not match pattern
#     [[  string <  pattern ]]   string comes before pattern in collation
#     [[  string >  pattern ]]   string comes after pattern in collation

#     [[  file1 -nt file2 ]]     file1 is newer than file1
```

```
#                                              or file2 does not exist
#       [[ file1 -ot file2 ]]          file1 is older than file1
#                                              or file2 does not exist
#       [[ file1 -ef file2 ]]          file1 is a link to file2

#       [[ exp1 -eq exp2 ]]            exp1 is equal to exp2
#       [[ exp1 -ne exp2 ]]            exp1 is not equal to exp2
#       [[ exp1 -gt exp2 ]]            exp1 is greater than exp2
#       [[ exp1 -ge exp2 ]]            exp1 is greater than or equal to exp2
#       [[ exp1 -lt exp2 ]]            exp1 is less than exp2
#       [[ exp1 -le exp2 ]]            exp1 less than or equal to exp2

#    Multiple Condition Testing
#       [[ -e file && -e file2 ]]      And condition
#       [[ -e file || -e file2 ]]      Or condition
#       [[ -e file && ! -e file2 ]]    And Not condition
#       [[ ! (-e file && -e file2 ]]   Not condition
#------------------------------------------------------------------

#    CASE command syntax examples
#       case $1 in
#           ( -i | -I) iflag=1;;
#           -x) xflag=1;&    #Fall through
#           -X) bigxflag=1;;
#           *) wrongflag=1;;
#       esac
#------------------------------------------------------------------

#    IF command syntax examples
#       if ((score < 65))
#       then
#            grade=F
#       elif ((score <80))
#       then
#            grade=C
#       else
#            grade=A
#       fi
#------------------------------------------------------------------

#    FOR command syntax examples
#       for i in fo*
#       do
#            print $i
#       done

#       for ((i=0; i<5; i++))
#       do
#            print -- ${array[i]}
#       done
```

FIG. 8J

```
#----------------------------------------

#  SELECT command syntax examples
#     PS3='Please select file to delete
#     select i in fo*
#     do
#          print 'Deleting file' $i
#            rm i
#     done
#----------------------------------------

#  UNTIL command syntax examples
#     until cc -c foo.c
#     do
#          vi fooc.
#     done
#----------------------------------------

#  WHILE command syntax examples
#     while read -r line
#     do
#          print -r - - $line
#     done
```

*FIG. 8K*

METHOD AND A SYSTEM FOR MANAGING SHELL SCRIPT FILE DEVELOPMENT AND EXECUTION

BACKGROUND OF THE INVENTION

1. Technical Field

The present invention relates generally to an improved data processing system and in particular to a method and an apparatus for managing the development and use of shell script files. Still more particularly, the present invention provides a method to generate a daily log file and individual transaction files for shell script commands.

2. Description of Related Art

The UNIX operating system is a multi-user operating system supporting serial or network connected terminals for more than one user. It supports multi-tasking and a hierarchical directory structure for the organization and maintenance of files. UNIX is portable, requiring only the kernel (<10%) written in assembler, and supports a wide range of support tools including development, debuggers, and compilers.

The UNIX operating system consists of the kernel, shell, and utilities. The kernel schedules tasks, manages data/file access and storage, enforces security mechanisms, and performs all hardware access. The shell presents each user with a prompt, interprets commands typed by a user, executes user commands, and supports a custom environment for each user. Finally, the utilities provide file management (rm, cat, ls, rmdir, mkdir), user management (passwd, chmod, chgrp), process management (kill, ps), and printing (lp, troff, pr).

A multi-user operating system allows more than one user to share the same computer system at the same time. It does this by time-slicing the computer processor at regular intervals between the various people using the system. Each user gets a set percentage of some amount of time for instruction execution during the time each user has the processor. After a user's allotted time has expired, the operations system intervenes, saving the program's state (program code and data), and then starts running the next user's program (for the user's set percentage of time). This process continues until, eventually, the first user has the processor again.

It takes time to save/restore the program's state and switch from one program to another (called dispatching). This action is performed by the kernel and must execute quickly, because it is important to spend the majority of time running user programs, not switching between them. The amount of time that is spent in the system state (i.e., running the kernel and performing tasks like switching between user programs) is called the system overhead and should typically be less than 10%.

Switching between user programs in main memory is done by part of the kernel. Main system memory is divided into portions for the operating system and user programs. Kernel space is kept separate from user programs. Where there is insufficient main memory to run a program, some other program residing in main memory must be written out to a disk unit to create some free memory space. A decision is made about which program is the best candidate to swap out to disk. This process is called swapping. When the system becomes overloaded (i.e., where there are more people than the system can handle), the operating system spends most of its time shuttling programs between main memory and the disk unit, and response time degrades.

In UNIX operating systems, each user is presented with a shell. This is a program that displays the user prompt, handles user input, and displays output on the terminal. The shell program provides a mechanism for customizing each user's setup requirements, and storing this information for re-use (in a file called .profile).

When the UNIX operating system starts up, it also starts a system process (getty) which monitors the state of each terminal input line. When getty detects that a user has turned on a terminal, it presents the logon prompt; and once the password is validated, the UNIX system associates the shell program (such as sh) with that terminal (typically there are a number of different shells including ksh and csh). Each user interacts with sh, which interprets each command typed. Internal commands are handled within the shell (set, unset); external commands are invoked as programs (ls, grep, sort, ps).

Multi-tasking operating systems permit more than one program to run at once. This is done in the same way as a multi-user system, by rapidly switching the processor between the various programs. OS/2, available from IBM Corporation, One New Orchard Road, Armonk, N.Y. 10504; and Windows 95, available from Microsoft Corporation, One Microsoft Way, Redmond, Wash. 98052, are examples of multi-tasking single-user operating systems. UNIX is an example of a multi-tasking multi-user operating system. A multi-user system is also a multi-tasking system. This means that a user can run more than one program at once, using key selections to switch between them. Multi-tasking systems support foreground and background tasks. A foreground task is one the user interacts directly with using the keyboard and screen. A background task is one that runs in the background (i.e., It does not have access to the screen or keyboard.). Background tasks include operations like printing, which can be spooled for later execution.

The role of the operating system is to keep track of all the programs, allocating resources like disks, memory, and printer queues as required. To do this, it must ensure that one program does not get more than its fair share of the computer resources. The operating system does this by two methods: scheduling priority, and system semaphores. Each program is assigned a priority level. Higher priority tasks (like reading and writing to the disk) are performed more regularly. User programs may have their priority adjusted dynamically, upwards or downwards, depending upon their activity and available system resources. System semaphores are used by the operating system to control system resources. A program can be assigned a resource by getting a semaphore (via a system call to the operating system). When the resource is no longer needed, the semaphore is returned to the operating system, which can then allocate it to another program.

Disk drives and printers are serial in nature. This means that only one request can be performed at any one time. In order for more than one user to use these resources at once, the operating system manages them via queues. Each serial device is associated with a queue. When a user program wants access to the disk, for example, it sends the request to the queue associated with the disk. The operating system runs background tasks (called daemons), which monitor these queues and service requests from them. A request is then performed by this daemon process, and the results are sent back to the user's program.

Multi-tasking systems provide a set of utilities for managing processes. In UNIX, these are ps (list processes), kill (kill a process), and & (run a process in the background). In UNIX, all user programs and application software use the system call interface to access system resources like disks, printers, memory etc. The system call interface in UNIX provides a set of system calls (C functions). The purpose of the system call interface is to provide system integrity. As all low level hardware access is under control of the operating system, this prevents a program from corrupting the system.

The operating system, upon receiving a system call, validates its authenticity or permission, then executes it on behalf of the program, after which it returns the results. If the request is invalid or not authenticated, then the operating system does not perform the request but simply returns an error code to the program. The system call is accessible as a set of 'C' functions, as the majority of UNIX is also written in 'C'. Typical system calls are: _read—for reading from the disk unit; _write—for writing to the disk unit; _getch—for reading a character from a terminal; _putch—for writing a character to the terminal; and _ioctl—for controlling and setting device parameters.

The fundamental structure that the UNIX operating system uses to store information is the file. A file is a sequence of bytes, typically 8 bits long, and is equivalent to a character. UNIX keeps track of files internally by assigning each one a unique identifying number. These numbers, called i-node numbers, are used only within the UNIX operating system kernel itself. While UNIX uses i-node number to refer to files, it allows users to identify each file by a user-assigned name. A file name can be any sequence containing from one to fourteen characters.

There are three types of files in the UNIX file system: (1) ordinary files, which may be executable programs, text, or other types of data used as input or produced as output from some operation; (2) directory files, which contain lists of files; and (3) special files, which provide a standard method of accessing I/O devices.

UNIX provides users with a way of organizing files. Files may be grouped into directories. Internally, a directory is a file that contains the names of ordinary files and other directories, and their corresponding i-node numbers. Given the name of a file, UNIX looks in the file's directory and obtains the corresponding i-node number for the file. With this i-node number, UNIX can examine other internal tables to determine where the file is stored and make it accessible to the user. UNIX directories themselves have names, each of which may also contain fourteen characters.

Just as directories provide a means for users to group files, UNIX supports the grouping of directories into a hierarchical file system. At the very top of a hierarchy is a directory. It may contain the names of individual files and the names of other directories. These, in turn, may contain the names of individual files and still other directories, and so on. A hierarchy of files is the result. The UNIX file hierarchy resembles an upside-down tree, with its root at the top. The various directories branch out until they finally trace a path to the individual files, which correspond to the tree's leaves. The UNIX file system is described as "tree-structured," with a single directory. All the files that can be reached by tracing a path down through the directory hierarchy from the root directory constitute the file system.

UNIX maintains a great deal of information about the files that it manages. For each file, the file system keeps track of the file's size, location, ownership, security, type, creation time, modification time, and access time. All of this information is maintained automatically by the file system as the files are created and used. UNIX file systems reside on mass storage devices such as disk files. These disk files may use fixed or removable type media, which may be rigid or flexible. UNIX organizes a disk as a sequence of blocks, which compose the file system. These blocks are usually either 512 or 2048 bytes long. The contents of a file are stored in one or more blocks, which may be widely scattered on the disk.

An ordinary file is addressed through the i-node structure. Each i-node is addressed by an index contained in an i-list. The i-list is generated based on the size of the file system, with larger file systems generally implying more files and, thus, larger i-lists. Each i-node contains thirteen 4-byte disk address elements. The direct i-node can contain up to ten block addresses. If the file is larger than this, then the eleventh address points to the first level indirect block. Address 12 and address 13 are used for second level and third level indirect blocks, respectively, with the indirect addressing chain before the first data block growing by one level as each new address slot in the direct i-node is required.

All input and output (I/O) is done by reading the writing files, because all peripheral devices, even terminals, are files in the file system. In a most general case, before reading and writing a file, it is necessary to inform the system of your intent to do so by opening the file. In order to write to a file, it may also be necessary to create it. When a file is opened or created (by way of the 'open' or 'create' system calls), the system checks for the right to do so and, if all is well, returns a non-negative integer called a file descriptor. Whenever I/O is to be done on this file, the file descriptor is used, instead of the name, to identify the file. This open file descriptor has associated with it a file table entry kept in the "process" space of the user who has opened the file. In UNIX terminology, the term "process" is used interchangeably with a program that is being executed. The file table entry contains information about an open file, including an i-node pointer for the file and the file pointer for the file, which defines the current position to be read or written in the file. All information about an open file is maintained by the system.

In conventional UNIX systems, all input and output is done by two system calls, 'read' and 'write,' which are accessed from programs having functions of the same name. For both system calls, the first argument is a file descriptor. The second argument is a pointer to a buffer that serves as the data source or destination. The third argument is the number of bytes to be transferred. Each 'read' or 'write' system call counts the number of bytes transferred. On reading, the number of bytes returned may be less than the number requested, because fewer than the number requested remain to be read. A return value of zero implies end of file, a return value of −1 indicates an error of some sort. For writing, the value returned is the number of bytes actually written. An error has occurred if this is not equal to the number which was supposed to be written.

The parameters of the 'read' and 'write' system calls may be manipulated by the application program that is accessing the file. The application must, therefore, be sensitive to and take advantage of the multi-level store characteristics inherent in a standard system memory hierarchy. It is advantageous, from the application perspective, if the system memory components can be viewed as a single level hierarchy. If this is properly done, the application could dispense with most of the I/O overhead.

One advantage of using a UNIX based operating system over other operating systems is that data can be isolated or segregated into different volume groups (VGs). The omnipresent "rootvg" contains the operating system details, and it is from this volume group that the computer runs. Similarly, data or application volume groups can also be created. The advantage of such volume groups is that, unlike competitive operating systems, an upgrade to a UNIX based operating system will only impact the rootvg, and will not affect application data. Analogously, application upgrades will not impact the operating system in any way, presuming that the application has been segregated into its own VG.

Faults are inevitable in digital computer systems due to such things as the complexity of the circuits and the associated electromechanical devices. To permit system operation, even after the occurrence of a fault, the art has developed a number of fault-tolerant designs. Improved fault-tolerant digital data processing systems include redundant functional units, e.g., duplicate CPUs, memories, and peripheral controllers interconnected along a common system bus. Each of a pair of functional units responds identically to input received from the bus. In the outputs, if a pair of functional units do not agree, that pair of units is taken off-line, and another pair of functional units (a "spare") continues to function in its place.

Even with the recent developments in fault-tolerant systems, there are characteristics of UNIX systems that make them difficult to adapt to conventional fault-tolerant operation. An important element of fault-tolerant systems is a maintenance and diagnostic system that automatically monitors the condition (or "state") of functional units of the data processing system, particularly those that are more readily replaceable ("field replaceable units," or FRUs). The complexity of UNIX based systems requires that such fault-tolerant systems maintenance and diagnostic systems (or "state machines") have capabilities that require state-of-the-art systems maintenance and diagnostics systems.

In today's complex Information Systems (IS) environment, maintaining consistency and control on computer systems is of the highest importance. This becomes especially critical given that various levels of administrative authentication exist on many systems, and often, numerous users can execute shell scripts and programs to affect the system environment. As multiple administrators take action on any given computer, tracking what has been done to that system and the results of any such technical activities becomes an administrative challenge.

The UNIX operating system and its variants, such as LINUX, are extensible in the sense that a system administrator can add system operations without having to modify the operating system itself. This is accomplished by writing a shell script for the new operation. These scripts look like programs but they are implemented at the system level. They contain variables that can be assigned values, conditions that can be tested, a large number of built-in string operations and file operations, control structures for selection between alternatives (e.g., if, case, select), control structures for repetition (e.g., while, for, until), and commands for inputting from and outputting to devices.

The user of the operation can be given extensive control over how the operation is performed by providing command line arguments. The syntax of a typical command is:

<<command>> { -<<letter>>[<<value>>] }
   { <<target>> } where { . . . } indicates zero or more occurrences and [ . . . ]indicates an optional occurrence. For example, lpr -Plp1 is a command called "lpr" (for outputting to a line printer), the "-P" argument designates a particular printer (printer "lp1" in this case), and memo.txt is the file to be printed. A shell script to process a command will typically declare and initialize variables, declare files, initialize flag settings to default values, process arguments to change default values as appropriate, and carry out the desired operation.

Although UNIX systems provide perhaps the most powerful set of operations to implement shell scripts, other command-line operating systems have similar facilities. For example, it is possible to write and execute batch files in the DOS operating system.

The extensibility of command-line operating systems and the ability to combine commands in various ways are two of the most appealing features of these systems. This allows the system administrator to adapt the operating system to an application environment quickly and easily. However, since shell scripts are used so extensively throughout a particular system, they are difficult to manage. Not all shell scripts complete successfully. For example, if the printer "lp1" in the previous "lpr" command is not recognized, or if the file "memo.txt" cannot be found, then the command fails and, typically, a message will be output to the screen.

Another potential problem is that shell scripts can be very powerful and make very extensive modifications to files within the user's filesystem. For example, a shell programmer could easily write a script to capitalize all alphabetic characters in a target file. An invocation of this command might be:

capitalize memo.txt where every lower case letter in the file "memo.txt" is converted to the corresponding uppercase character. The shell programmer may then decide to let the user specify wildcards, such as capitalize *.txt that would convert all lowercase letters in every file with the ".txt" suffix in the current subdirectory to upper case characters. Suppose the script programmer then decided to allow a "-R" argument to indicate recursive application of this command to the current directory and all of it subdirectories. Consider the command:

capitalize -R * called in the root directory; it would end up modifying almost all files in the user's file system. Such are the perils of running shell scripts that can modify files in a user's file system.

Clearly there is a need to keep track of all shell script activities so that a system administrator can find out what has been happening during the course of daily activities. Typically these efforts are individualized and information is spread throughout the system. Only the system administrator who designed and implemented these monitoring activities could find and analyze the information gathered.

Therefore, it would be advantageous to have a method and system to have all shell scripts log their operation in a systematic and uniform manner. There needs to be one central file that shows all shell scripts that have been executed, including execution time and outcome, and a log file for each command showing the detailed operation for each command invocation. The present invention addresses these problems directly.

SUMMARY OF THE INVENTION

The present invention relates to a system and method for setting up a central point-of-reference which is available for checking the results of script execution. By inserting uniform "libraying" text on all scripts executed on the computer, administrators can now tell at a glance every script that has been executed. Furthermore, administrators can easily tell the results of all automatically run programs (such as overnight batch jobs) by looking in a common location rather than all over the computer. All scripts installed on a computer system are required to have the ability to generate uniform output. This output includes the script name, the time it was run, the user name, and the script execution results. When a script is executed, it will write this detailed output into a predefined directory. There, a file is generated which lists all the parameters associated with the script execution. The parameters are then available for future review by administrators. Additionally, an executed script writes a summary output to a common file. This file provides a single point of reference and further provides a summary description for all activities.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 7A–7D depict a script called SUMMARY.KSH, which would be run daily and creates a new summary log file for the working scripts to log to; and FIGS. 8A–8K depict a script called TMPL1.KSH, which is a template for creating scripts that perform various logging and reporting of progress and problems.

DETAILED DESCRIPTION OF THE PREFERRED EMBODIMENT

Figure 1:
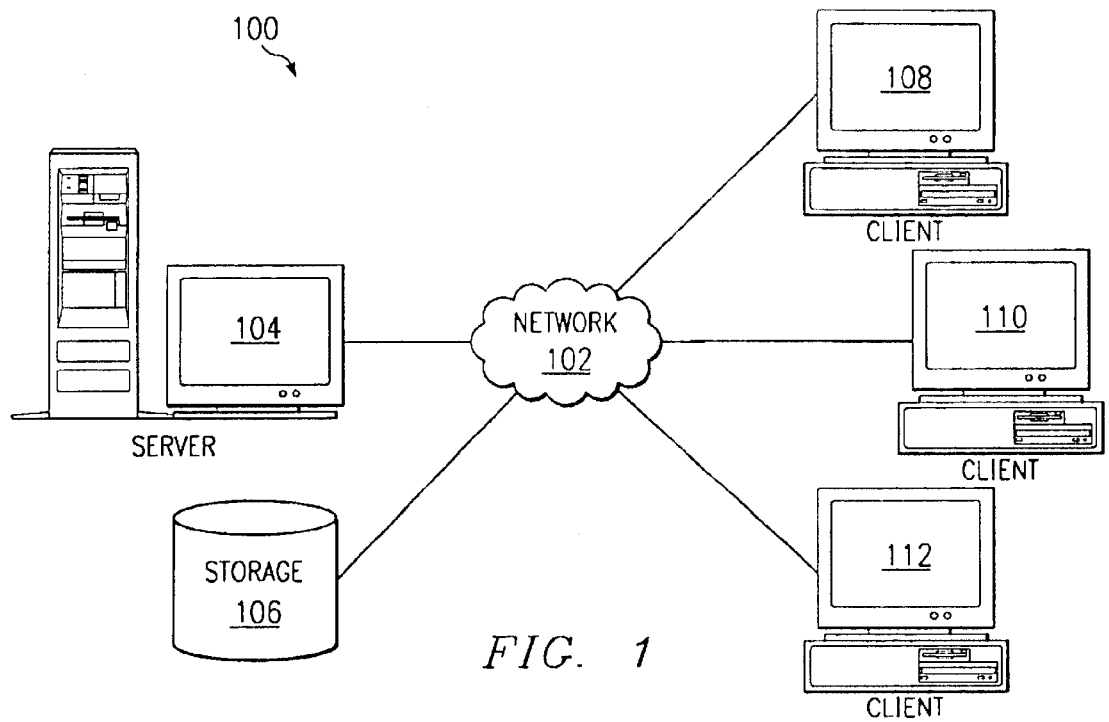
FIG. 1 is a pictorial representation of a distributed data processing system in which the present invention may be implemented.

With reference now to the figures, FIG. 1 is a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110 and 112 also are connected to network 102. These clients 108, 110 and 112 may be, for example, personal computers or network computers. For purposes of this application, a network computer is any computer coupled to a network, which receives a program or other application from another computer coupled to the network. In the depicted example, server 104 provides data, such as boot files, operating system images, and applications to clients 108, 110 and 112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, education, and other computer systems that route data and messages. Of course, distributed data processing system 100 may also be implemented as a number of different types of networks, such as an intranet, a local area network (LAN), or a wide area network (WAN). FIG. 1 is intended as an example and not as an architectural limitation for the present invention.

Figure 2:
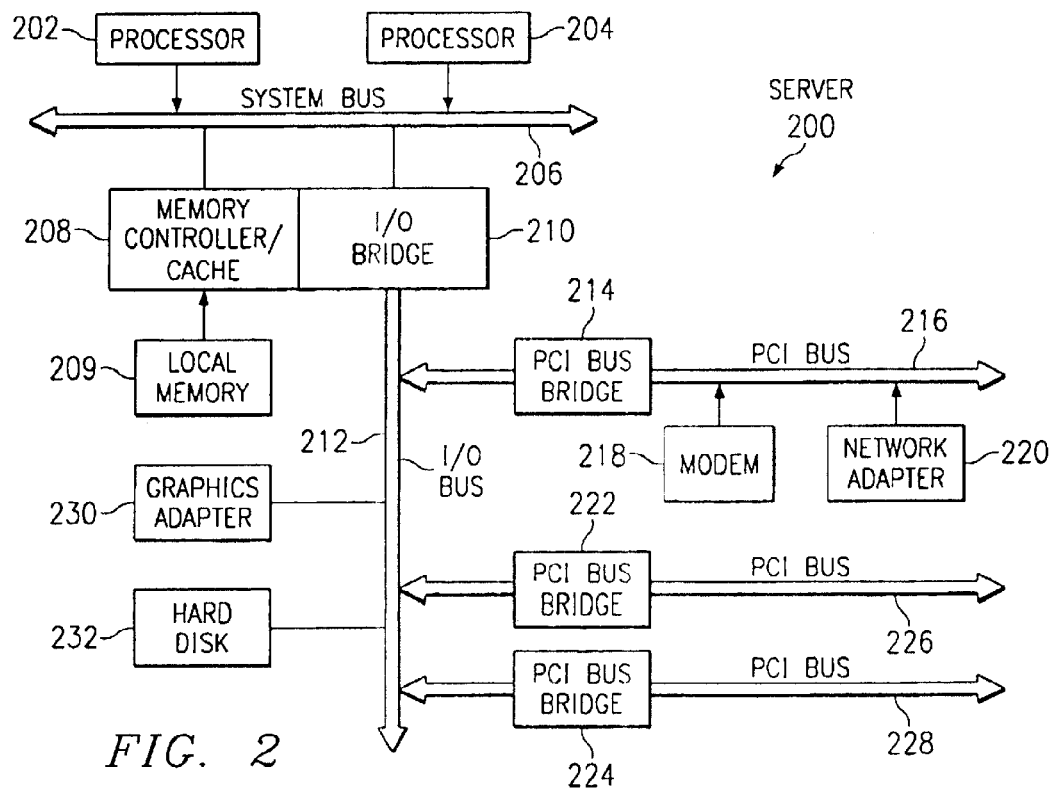
FIG. 2 is a block diagram depicting a data processing system that may be implemented as a server in accordance with a preferred embodiment of the present invention.

Referring to FIG. 2, a block diagram depicting a data processing system, which may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. A memory-mapped graphics adapter 230 and hard disk 232 may also be connected to I/O bus 212 as depicted, either directly or indirectly.

Figure 3:
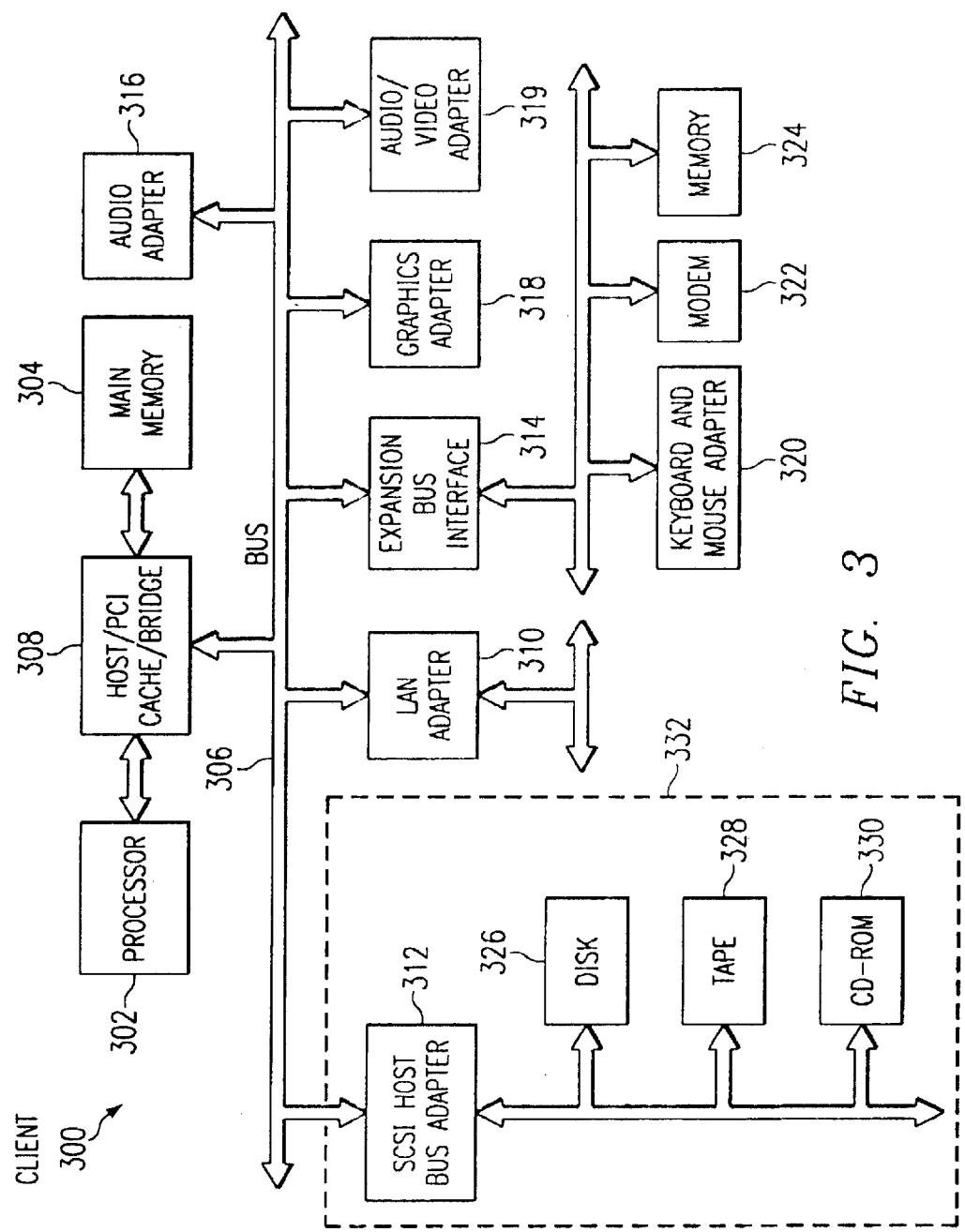
FIG. 3 is a block diagram illustrating a data processing system in which the present invention may be implemented.

With reference now to FIG. 3, a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations support three or four PCI expansion slots or add-in connectors.

An operating system runs on processor 302 and is used to coordinate and provide control of various components within data processing system 300 in FIG. 3. The operating system may be a commercially available operating system such as a UNIX based operating system, AIX for instance, which is available from International Business Machines Corporation. "AIX" is a trademark of International Business Machines Corporation. Other operating systems include OS/2. An object oriented programming system, such as Java, may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3, denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide nonvolatile memory for storing operating system files and/or user-generated data.

The depicted example in FIG. 3, as well as above described examples, are not meant to imply architectural limitations. As discussed above, until the present invention, there has been no central point-of-reference available for checking the results of script execution. Each administrative user would check the results of their own script execution, and/or the root user could check in a variety of locations for output files, if such files existed. What is needed is a uniform means of tracking computer system modifications and recording what maintenance scripts have been executed at any given time.

In accordance with a preferred embodiment of the present invention, a method of tracking such system modifications has been developed. By inserting uniform "libraying" text on all scripts executed on the computer, administrators can now tell at a glance every script that has been executed. Furthermore, administrators can easily tell the results of all automatically run programs (such as overnight batch jobs) by looking in a common location rather than all over the computer. Script examples, as pertinent to this exemplary art, might include filesystem backups, removal of temporary files, security inspection scripts, application-driven scripts performing automated software maintenance, or shutting down or starting up an application at a given time. All such examples can take part in this library system by performing the following steps:

1. All scripts installed on the UNIX computer system are required to have the ability to generate uniform output. This output includes all or a portion of the following:
   (a) The name of the script;
   (b) The time the script was run;
   (c) The user who executed the script; and
   (d) The results of the script execution with any error outputs, success messages, or other necessary text.
2. When a script is executed, it will write this detailed output into the /var/adm/scriptlogs directory. Here, a file will be generated to list all the parameters associated with the script execution. It is then available for future review by administrators, as desired. Within a common directory now exists the details of all scripted system management activity transpiring on the system. Note that, if non-root operators are to be running the referenced scripts, then the logs must be placed into a directory that is writeable by this operator.
3. When executed, a script can also write a summary output to a common file, known colloquially as the "daily file." This file provides a single point of reference and would be the summary description for all activities. Daily printing and reviewing of this file is recommended, so that the administrator knows everything that has occurred on the system in question.

From the steps above, it is seen that reviewing a directory listing of the /var/adm/scriptlogs might reveal something like:

script1.log.1jan1999
script2.log.1jan1999
script3.log.1jan1999
" "
script20.log.1jan1999
daily.log.1jan1999
daily.log.2jan1999

Within each of these individual script logs would lie the details of all manual and automated scripted management activities. Within the daily.log is the summary, featuring inputs by all executed scripts, which in turn tells the administrator which maintenance scripts have been executed.

Such innovations increase a computer's ease-of-use and serviceability, and in turn, heighten a client's level of satisfaction with both their hardware and software. Although this library system was developed on IBM's AIX, it will also work on LINUX and other UNIX systems as well. The concept, by itself, will of course extend to any operating system which permits shell, batch, or other automated tasks.

Figure 4:
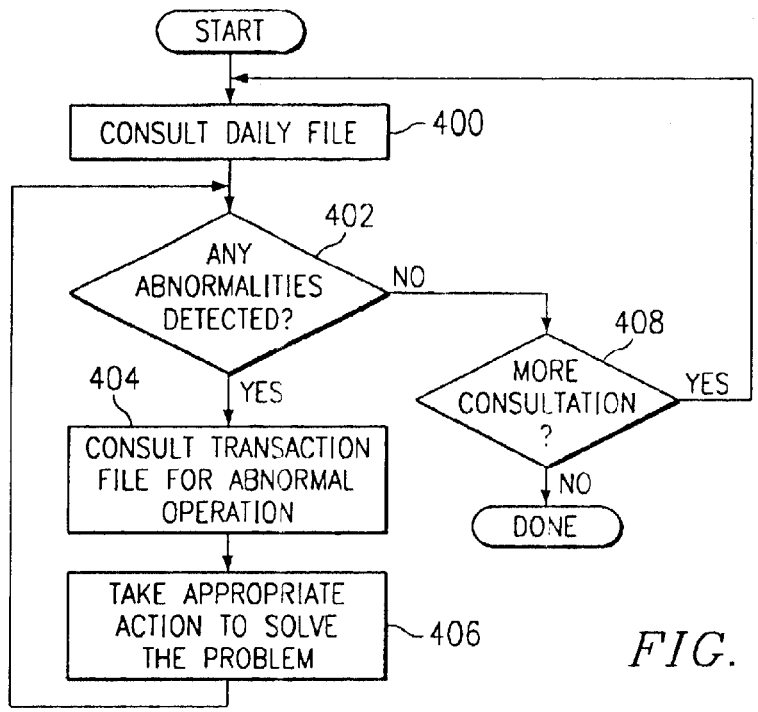
FIG. 4 is a flowchart showing how a system administrator would use the daily log and transaction files in accordance with a preferred embodiment of the present invention.

With reference now to FIG. 4, a flowchart showing system administrator usage of logging files in accordance with the preferred embodiment of the invention. The system administrator periodically inspects the global "Daily" File (step 400). This file contains information on every shell script run on the system; it records the start time and completion status of all scripts. This file is checked for abnormalities (step 402). If an abnormality is detected, the transaction file for the particular operation is examined in detail (step 404). Appropriate action is taken to solve the abnormal behavior (step 406). This process continues for any remaining abnormalities by returning to step 402. Once all abnormalities have been dealt with, this consultation is complete. If at a later time there is another consultation (step 408), the process can be repeated by returning to step 400. If no more consultations are desired, the administrator usage of the logging files is complete.

Figure 5:
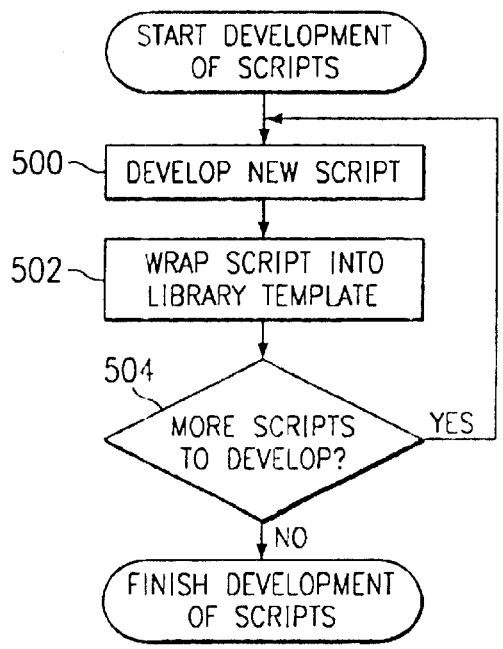
FIG. 5 is a flowchart showing how a script programmer would develop shell scripts in accordance with a preferred embodiment of the present invention.

With reference now to FIG. 5, a flowchart showing the development of shell scripts in accordance with the preferred embodiment of the invention. A new shell script is developed (step 500). This script is then augmented with the required library routines; this is a standard template that can be inserted at appropriate locations in the script (step 502). If there are more scripts to be developed (step 504), then the process starts again at step 500. If there are no more new scripts to be developed, the process is completed. A similar sequence of activities can be used to modify existing script files that have not been enhanced with logging features.

Figure 6:
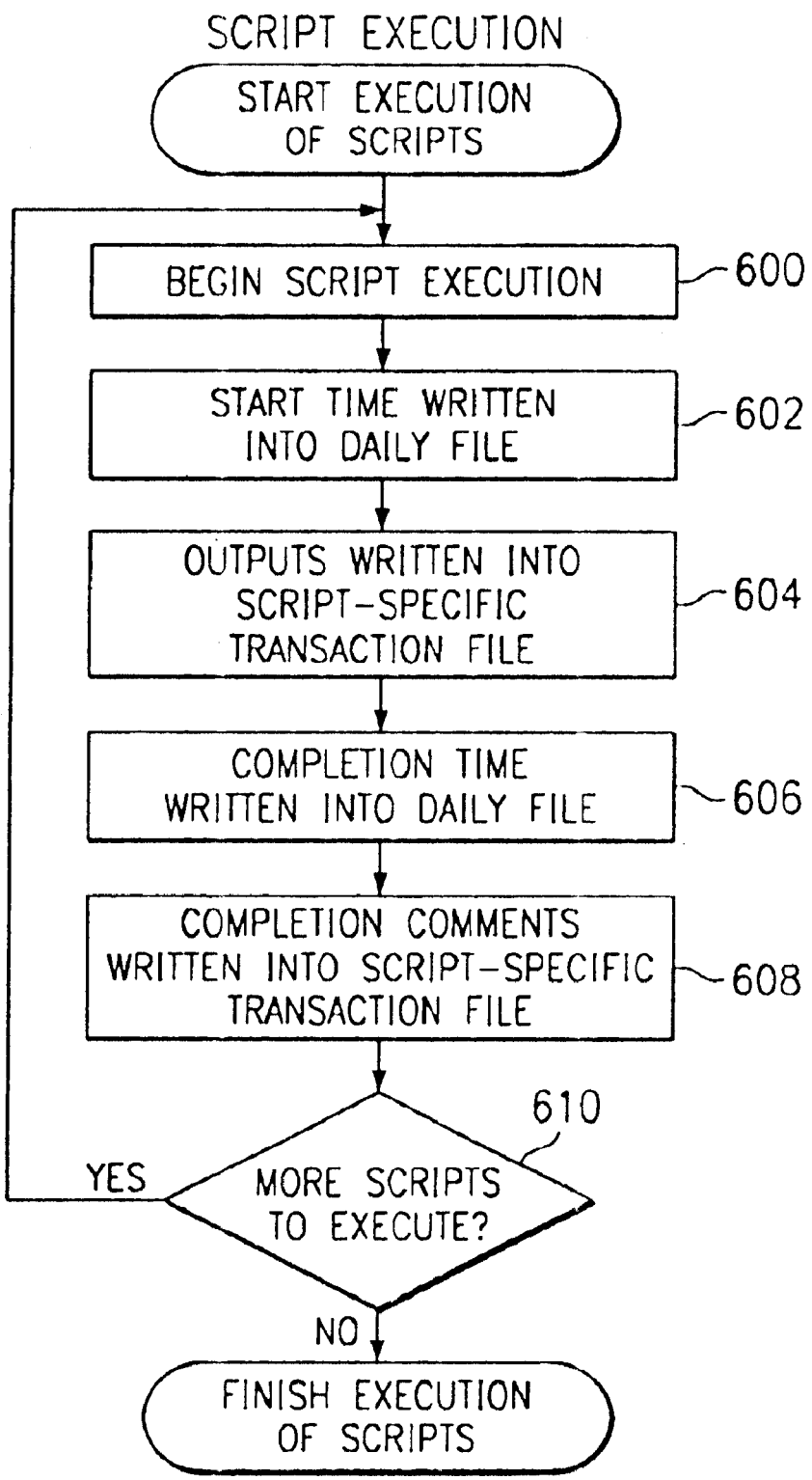
FIG. 6 is a flowchart showing how script execution interacts with the daily log and transaction files in accordance with a preferred embodiment of the present invention.

With reference now to FIG. 6, a flowchart showing the execution of shell scripts in accordance with the preferred embodiment of the invention. Shell scripts are executed frequently in a UNIX environment; some scripts are run automatically, while others are invoked by human users. As described above, two types of files are maintained: a global "Daily" File that keeps a summary of all script activity and a "Transaction" File. There is one file for each operation type. When a script begins execution (step 600), the start time and operation name is written to the "Daily" File (step 602). As the script executes, any detailed output relating to the operation is written to the "Transaction" File for that operation (step 604). When the shell script is finished, the completion time is written to the "Daily" File (step 606). The completion comments are then written to a script specific "Transaction" File (step 608). As long as there are scripts to execute (checked at step 610), this process is repeated for the next script starting at step 600. If there are no more scripts to execute (checked at step 610), then the script execution process is complete.

FIGS. 7A–7D illustrate a script called SUMMARY.KSH, which would be run daily and creates a new summary log file for the working scripts to log to.

FIGS. 8A–8K illustrate a script called TMPL1.KSH which is a template for creating scripts that perform various logging and reporting of progress and problems. The template is also an example. In use, it would actually perform an AIX system backup operation. The real work is contained in the AIX "mksysb" commands.

The logging facilities described above are implemented by adding a standard template code to each shell script file. Each of these components is discussed individually followed by a complete script example for a command to make system backups, "mksysb". These examples assume the following command line arguments:

-l directory Log output directory

-r days Log retention period

-L Prevent results logging

-M address E-mail notification of completion status

With reference now to FIGS. 8D and 8E, a portion of a shell script template that shows processing of command line arguments in accordance with the preferred embodiment of the invention.

```
log_dir=$default_log_dir
# Parse Command Line Arguments into Variables
while getopts f:l:emM:Ljr# c
do
    case $c in
    L)  # Set up the -L flag
        L_flag=1;;
    l)  # Set up the -l flag
        l_flag=1
        log_dir=$OPTARG;;
    r)  # Set up the -r flag
        r_flag=1
        in_retain_days=$OPTARG;;
    M)  # Set up the -M flag
        L_flag=0
        M_flag=1
        in_email_address=$OPTARG;;
    << other arguments specific to command >>
    esac
done
```

The first portion of the script loops through the command line arguments processing them one at a time. The processing for "L", "l", "r", and "M" is shown; other command line arguments will be specific to the command being implemented. The "-L" argument sets "L_flag" equal to 1; this will prevent logging. The "-l" argument sets "l_flag" to 1 and stores the specified directory in "log_dir". The "-r" argument sets the "r_flag" to 1 and stores the value in "in_retain_days". The "-M" argument sets the "M_flag" to 1, sets the "L_flag" to 0, and stores the value in "in_email_address".

The next code fragment shows steps in processing the command arguments as entered. If the "L_flag" is set, the log file is set to null (commonly referred to as the "bit bucket"). If the "l_flag" is set, the variable "log_file" is bound to the appropriate path and file name, the new log directory is created, and the default log directory is created. If neither flag is set, the default path and file name is assigned to "log_file" and the default log directory is created. If the "r-flag" is set, then the number of days to retain the log is stored in "retain_days". The old log file is then cleared and the new log file is created.

With reference now to FIG. 8F, a portion of a shell script template that shows the initial and final entries for the summary work file in accordance with the preferred embodiment of the invention.

```
if [[ $L_flag -eq 0 ]]; then
exec 4> $summary_work_file    # Open summary work file for writing
print -u4
"\n===================================================="
print -u4 "=
      ="
print -u4 "=      System Admin Script File Starting
      ="
print -u4 "=
      ="
print -u4 "=      Generated  by script:   " $script_name
print -u4 "=                 on system:   " $(hostname)
print -u4 "=                 at:          " $(date)
print -u4 "=
      ="
print -u4
"===================================================="
exec 4<&-
cat $summary_work_file >>$summary_log
cat $summary_work_file >$summary_file
fi
```

The summary work file is the "Daily" File for all script activities. The first code fragment shows the entry indicating the start of the script and the second code fragment shows the exit indicating the completion of a script. If the "L_flag" is not set (that is, its value is 0 and not 1), then the summary work file is opened, the start script message is written, and the file is closed. A similar sequence of activities occurs when ending a script, except in this case the outcome of successful or unsuccessful is recorded.

With reference now to FIG. 8F, a portion of a shell script template that shows the initial and final entries for the transaction file in accordance with the preferred embodiment of the invention.

```
print -u3
"\n======================================================="
print -u3 "=
="
print -u3 "=        Systems Management Transaction Log
="
print -u3 "=
="
if [[ $completion_code -eq 0 ]]; then
    print -u3 "=     Completed successfully at       :" $(date)
else
    print -u3 "=     Completed UNSUCCESSFULLY at     :" $(date)
fi
print -u3 "=
="
print -u3
"======================================================="
```

The logging of the start and ending messages is unconditional, but recall that the user can specify the "bit bucket" to receive this logging activity. What is not shown in the figure is the command specific output to the transaction file. The content and timing of this output is dependent on the shell command being implemented.

With reference now to FIG. 8H, a portion of a shell script template that shows sending an email of start and stop information to the designated address in accordance with the preferred embodiment of the invention.

```
if [[ $M_flag -eq 1 ]]; then
    mail -s "Script Log Status" $in_email_address
    <$summary_file
fi
```

If the "M-flag" has been set, then an email is sent to the specified user after the script in completed.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media, such as floppy discs, hard disk drives, RAM, CD-ROMs, and transmission-type media, such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles and practical application of the invention, as well as to enable others of ordinary skill in the art to understand the invention for various embodiments with various modifications, as are suited to the particular use contemplated.

What is claimed is:

1. A data processing system implemented method for implementing a central point-of-reference for script execution results, comprising:

establishing a script;

including a library command in said script, said library command specifying a predetermined location;

executing said script;

generating a record in response to said executing said script, wherein the record contains data concerning said script and execution of said script;

during said execution of said script, executing said library command included in said script; and in response to executing said library command said script, writing the record to said predetermined location.

2. The method recited in claim 1, further comprising:

establishing a second script;

including a library command in said second script, said library command specifying said predetermined location;

executing said second script;

generating a second record in response to executing said second script, wherein the second record contains data concerning said second script and execution of the second script;

during said execution of said second script, executing said library command included in said second script; and in response to executing said library command included in said second script, writing the second record to the predetermined location.

3. The method recited in claim 2, further comprising:

generating a second execution summary; and adding the second execution summary to the execution summary file.

4. The method recited in claim 1, wherein the record comprises one of an identity of the script, a time the script was executed, a user who executed the script, and results of the execution of the script.

5. The method recited in claim 1, further comprising:

generating an execution summary; and adding the execution summary to an execution summary file.

6. The method recited in claim 5, wherein the execution summary is located at the predetermined location.

7. The method recited in claim 6, wherein information available at the predetermined location comprises a record of at least a last script executed on the data processing system and the execution summary of each script executed during a predefined time period.

8. The method recited in claim 1, wherein executing the script is performed in response to one of a filesystem backup, removal of a temporary file, a security inspection script, an application-driven script, or shutting down or starting up an application.

9. The method according to claim 1, comprising:

accessing information at said predefined location, wherein the information comprises data related to said script executed on the data processing system in a predefined time period.

10. The method recited in claim 9, wherein the information containing data related to the script further comprises one of an identity of the script, a time the script was executed, a user who executed the script, and results of the execution of the script.

11. The method recited in claim 9, wherein the information containing data related to the script further comprises information related to all scripts executed on the data processing system during the predefined time period.

12. A data processing system for implementing a central point-of-reference for script execution results, comprising:
   means for establishing a script;
   means for including a library command in said script, said library command specifying a predetermined location;
   executing means for executing said script;
   generating means for generating a record in response to said executing said script, wherein the record contains data concerning said script and execution of said script;
   during said execution of said script, means for executing said library command included in said script; and
   in response to executing said library command said script, writing means for writing the record to said predetermined location.

13. The system recited in claim 12, further comprising:
   means for establishing a second script;
   means for including a library command in said second script, said library command specifying said predetermined location;
   executing means for executing said second script;
   generating means for generating a second record in response to executing said second script, wherein the second record contains data concerning said second script and execution of the second script;
   during said execution of said second script, means for executing said library command included in said second script; and
   in response to executing said library command included in said second script, writing means for writing the second record to the predetermined location.

14. The system recited in claim 13, further comprising:
   generating means for generating a second execution summary; and
   adding means for adding the second execution summary to the execution summary file.

15. The system recited in claim 12, wherein the record comprises one of an identity of the script, a time the script was executed, a user who executed the script, and results of the execution of the script.

16. The system recited in claim 12, further comprising:
   generating means for generating an execution summary; and
   adding means for adding the execution summary to an execution summary file.

17. The system recited in claim 16, wherein the execution summary is located at the predetermined location.

18. The system recited in claim 17, wherein information available at the predetermined location comprises a record of at least a last script executed on the data processing system and the execution summary of each script executed during a predefined time period.

19. The system recited in claim 12, wherein the executing means for executing the script executes the script in response to one of a filesystem backup, removal of a temporary file, a security inspection script, an application-driven script, or shutting down or starting up an application.

20. The data processing system according to claim 12, comprising:
   accessing means for accessing information at said predefined location, wherein the information comprises data related to said script executed on the data processing system in a predefined time period.

21. The system recited in claim 20, wherein the information containing data related to the script further comprises one of an identity of the script, a time the script was executed, a user who executed the script, and results of the execution of the script.

22. The system recited in claim 20, wherein the information containing data related to the script further comprises information related to all scripts executed on the data processing system during the predefined time period.

23. A data processing system implemented computer program product for implementing a central point-of-reference for script execution results, comprising:
   instruction means for establishing a script;
   instruction means for including a library command in said script, said library command specifying a predetermined location;
   executing instructions for executing said script;
   generating instructions for generating a record in response to said executing said script, wherein the record contains data concerning said script and execution of said script;
   during said execution of said script, instruction means for executing library command included in said script; and
   in response to executing said library command said script, writing instructions for writing the record to said predetermined location.

24. A data processing system implemented method for implementing a central point-of-reference for script execution results, comprising:
   establishing a plurality of scripts;
   including a library command in each one of said plurality of scripts, each one of said library commands specifying a predetermined location;
   executing said plurality of scripts;
   generating a record in response to said executing said plurality of scripts, wherein the record contains data concerning said each one of said plurality of scripts and execution of said each one of said plurality of scripts;
   during said execution of each one of said plurality of scripts, executing said library command included in each one of said plurality of scripts; and
   in response to executing said library command included in each one of said plurality of scripts, writing the record for each one of said plurality of scripts to said predetermined location.

25. A data processing system for implementing a central point-of-reference for script execution results, comprising:
   means for establishing a plurality of scripts;
   means for including a library command in each one of said plurality of scripts, each one of said library commands specifying a predetermined location;
   means for executing said plurality of scripts;
   means for generating a record in response to said executing said plurality of scripts, wherein the record contains data concerning said each one of said plurality of scripts and execution of said each one of said plurality of scripts;
   means during said execution of each one of said plurality of scripts, for executing said library command included in each one of said plurality of scripts; and
   in response to executing said library command included in each one of said plurality of scripts, means for writing the record for each one of said plurality of scripts to said predetermined location.

* * * * *

UNITED STATES PATENT AND TRADEMARK OFFICE
CERTIFICATE OF CORRECTION

PATENT NO. : 6,904,424 B1
APPLICATION NO. : 09/422370
DATED : June 7, 2005
INVENTOR(S) : Gusler et al.

It is certified that error appears in the above-identified patent and that said Letters Patent is hereby corrected as shown below:

Title page, (74) Attorney, Agent, or Firm: delete "Lisa B.Yociss" and insert --Lisa L.B. Yociss--.

Signed and Sealed this

Twenty-eighth Day of November, 2006

JON W. DUDAS
*Director of the United States Patent and Trademark Office*